United States Patent
McClannahan (12)

(10) Patent No.: US 6,438,670 B1
(45) Date of Patent: Aug. 20, 2002

(54) MEMORY CONTROLLER WITH PROGRAMMABLE DELAY COUNTER FOR TUNING PERFORMANCE BASED ON TIMING PARAMETER OF CONTROLLED MEMORY STORAGE DEVICE

(75) Inventor: Gary Paul McClannahan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/166,004

(22) Filed: Oct. 2, 1998

(51) Int. Cl.[7] .............................................. G06F 12/00
(52) U.S. Cl. ...................... 711/167; 711/168; 711/169; 710/240; 713/401; 365/194
(58) Field of Search ........................ 711/167–169, 157; 710/40, 45, 240; 712/245; 713/401; 714/718; 365/194, 230.03

(56) References Cited

U.S. PATENT DOCUMENTS 4,063,308 A * 12/1977 Collins et al. ............... 364/200
5,276,858 A * 1/1994 Oak et al. .................... 395/550
5,809,340 A   9/1998 Bertone et al. .............. 395/878
6,088,774 A * 7/2000 Gillingham .................. 711/167

FOREIGN PATENT DOCUMENTS

| EP | 339224 | 11/1989 | ............ G11C/7/00 |
| WO | 9710538 | 3/1997 | ............ G06F/1/04 |
| WO | 97/10538 | * 3/1997 | ............ G06F/1/04 |

* cited by examiner

*Primary Examiner*—Matthew Kim
*Assistant Examiner*—Pierre M Vital
(74) *Attorney, Agent, or Firm*—Wood, Herron & Evans

(57) ABSTRACT

A memory controller circuit arrangement and method utilize a tuning circuit that controls the timing of memory control operations via one or more programmable delay counters. Each counter is programmed to cycle a selected number of clock cycles to delay performance of a memory control operation to meet a predetermined timing parameter for a memory storage device coupled to the controller. Through the use of programmable delay counters, a variety of memory storage devices having varying timing parameters may be supported by the same memory controller design. Moreover, the use of programmable delay counters permit a single path of execution in a memory controller state machine to support any number of timing parameter variations for a particular timing characteristic, as well as multiple timing characteristics.

24 Claims, 6 Drawing Sheets

MEMORY CONTROLLER WITH PROGRAMMABLE DELAY COUNTER FOR TUNING PERFORMANCE BASED ON TIMING PARAMETER OF CONTROLLED MEMORY STORAGE DEVICE

FIELD OF THE INVENTION

The invention is generally related to integrated circuit device architecture and design, and in particular to the architecture and design of a memory controller for controlling data transfer with a memory storage device.

BACKGROUND OF THE INVENTION

Computers and other data processing systems rely extensively on various memories to store information used by such systems in performing computer tasks. A memory may be used, for example, to store a portion of a computer program that is executed by a computer, as well as the data that is operated upon by the computer.

Memories may also be found in many of the components of a computer. For example, a microprocessor, the "brains" of a computer, may have a dedicated cache memory that permits faster access to certain data or computer instructions than otherwise available from the main memory of the computer. Also, dedicated memory may be used by a graphics controller to store the information to display on a computer monitor or other display.

Memories may also be found in many types of interfaces for a computer, e.g., to interface a computer with other computers via an external network. The interfaces are typically implemented using dedicated hardware, e.g., a network adapter card that plugs into the computer and has the necessary connectors for connecting to a particular type of network. A controller is typically used to handle the transfer of data between the computer and the network, and a dedicated memory is typically used to store control data used by the controller, as well as a temporary copy of the data being transmitted over the interface.

Memory used in the above applications are typically implemented using one or more solid-state memory storage devices, or "chips". A dedicated memory controller is typically used to handle the data transfer to and from such memory storage devices according to a predefined protocol.

Memory storage devices typically have one or more timing characteristics that define the minimum delays that one must wait before performing certain operations with the devices. Timing parameters, related to such characteristics, are thus defined for specific memory storage device implementations. These timing parameters are often limited by the physical structures of the devices, and are defined by the designers of the devices to ensure reliable operation of the devices. As but one example, one type of memory storage device, a dynamic random access memory (DRAM) device, requires that circuitry within the device be "precharged" for at least a predetermined time before data can be read from the device. Should the timing parameter associated with this characteristic for a specific memory storage device implementation not be met, errors may occur in the device, which could jeopardize the validity of the data.

Different types of memory storage devices may have different timing parameters. Moreover, as technology improves, memory storage devices of a given type may be improved over past designs, and as a result may have different timing parameters from the past designs.

To control data transfer with a given type of memory storage device, a memory controller must often be specifically tailored to meet the various timing parameters for that device. To ensure the best possible performance with a given type of memory storage device, it is often desirable for the memory controller to set the delays between various memory control operations to meet or only slightly exceed the timing parameters defined for the device.

Some memory controllers, however, may need to be used with different types of memory storage devices. For example, it may be desirable to support multiple types of memory storage devices so that the memory controller may be used in different applications. However, to support multiple types of memory storage devices often necessitates that a memory controller be designed to handle the worst case timing parameters of a given memory storage device, since the timing parameters typically define minimum acceptable delays. As a result, when a memory controller is used with a memory storage device having timing parameters that offer faster performance than the worst case timing parameters defined for the controller, the memory storage device is operated at below its maximum performance level, and the improved performance that could otherwise be realized by the device is lost.

Some conventional memory controller designs attempt to support different timing parameters for a given timing characteristic by controllably inserting one or more "wait states" into a memory access operation to account for a performance mismatch between the controller and a memory storage device. Typically, such controller designs support one of two timing parameters by controllably selecting one of two possible "paths" of execution.

Specifically, a memory controller typically operates using a state machine that cycles between different "stages" to perform different memory control operations associated with controlling the data transfer with a memory storage device. The state machine is timed by a clock signal that defines the time to wait between each stage. A path of execution is defined by the sequence of stages that are sequentially performed in the state machine when following the path.

An important limitation of such conventional memory controller designs is that supporting a second path of execution can significantly increase the complexity of the state machine, which tends to increase the overall cost and complexity of the controller. Moreover, the complexity of the state machine increases dramatically as the number of execution paths increases. Furthermore, if it is desirable to support variable timing parameters for multiple timing characteristics, the complexity of the state machine increases at an even greater rate. As a result, conventional memory controller designs are typically limited to supporting only a very few timing parameters for only a very few timing characteristics.

Furthermore, due to the inability of conventional memory controller designs to support a wide variety of memory storage devices, it is often not cost-effective to anticipate the use of such designs with future memory storage devices that may have shorter timing parameters, and as a result improved performance, over current devices. Consequently, often new memory controller designs must be developed in response to advances in memory storage device technology.

Therefore, a significant need continues to exist for a more flexible and extensible memory controller design that is capable of supporting a wider variety of memory storage devices.

SUMMARY OF THE INVENTION

The invention addresses these and other problems associated with the prior art by providing a memory controller circuit arrangement and method that utilize a tuning circuit that controls the timing of memory control operations via one or more programmable delay counters. Each counter is programmed to cycle a selected number of clock cycles to delay performance of a memory control operation to meet a predetermined timing parameter for a memory storage device coupled to the controller.

A programmable delay counter may be used, for example, to enable a state transition in a state machine logic circuit to initiate performance of a memory control operation by the logic circuit, among other implementations. As a result, a single path of execution in the logic circuit may be used to support any number of timing parameter variations for a particular timing characteristic. Moreover, through the use of multiple programmable delay counters, multiple timing characteristics may be adjusted within the same path of execution. Consequently, a wide variety of timing characteristics and timing parameters therefor may be supported in a single integrated design, offering greater flexibility and extensibility than conventional designs.

Therefore, consistent with one aspect of the invention, a memory controller circuit arrangement is provided, including a logic circuit and a tuning circuit. The logic circuit is configured to control data transfer with at least one memory storage device by performing first and second memory control operations. The memory storage device of the type having a predetermined timing parameter that defines a minimum delay between the first and second memory control operations. The tuning circuit is coupled to the logic circuit and is configured to control the delay between the first and second memory control operations to meet the predetermined timing parameter for the memory storage device by cycling a programmable delay counter a selected number of clock cycles to delay performance of the second memory control operation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The herein-described embodiments generally operate by cycling a programmable delay counter in a memory controller to delay performance of a memory control operation to meet a timing parameter for a memory storage device coupled to the memory controller. As such, a wide variety of solid-state (semiconductor) memory storage devices having varying timing parameters may be supported in a flexible and extensible manner, including but not limited to Synchronous Dynamic Random Access Memories (DRAM's), Enhanced Synchronous DRAM's, Rambus DRAM's, Extended Data Out (EDO) DRAM's, page-mode DRAM's, Static Random Access Memories (SRAM's), Flash Memories, Read Only Memories (ROM's), Electrically-Erasable Programmable Read Only Memories (EEPROM's), Serial EPROM's, Direct Access Storage Devices (DASD's), subsystems acting as memory, etc.

Three primary situations occur in which it may be desirable to tune the performance of a memory controller in the manner presented herein. First, it is often desirable to control the delay between asserting and deasserting signals within a given memory access cycle, e.g., the time period between asserting the row and column address strobe ($\overline{RAS}$ and $\overline{CAS}$) signals for a given memory access. Second, it is often desirable to control the delay between asserting and deasserting signals between successive memory access cycles, e.g., the delay between asserting and releasing the $\overline{RAS}$ precharge time for an EDO DRAM. Third, it is often desirable to control the delay between asserting and deasserting signals between non-successive but interrelated memory access cycles, e.g., the delays between successive accesses to a given bank in a multi-bank DRAM. Other situations will become apparent to one of ordinary skill in the art from a reading of the material herein.

Figure 1:
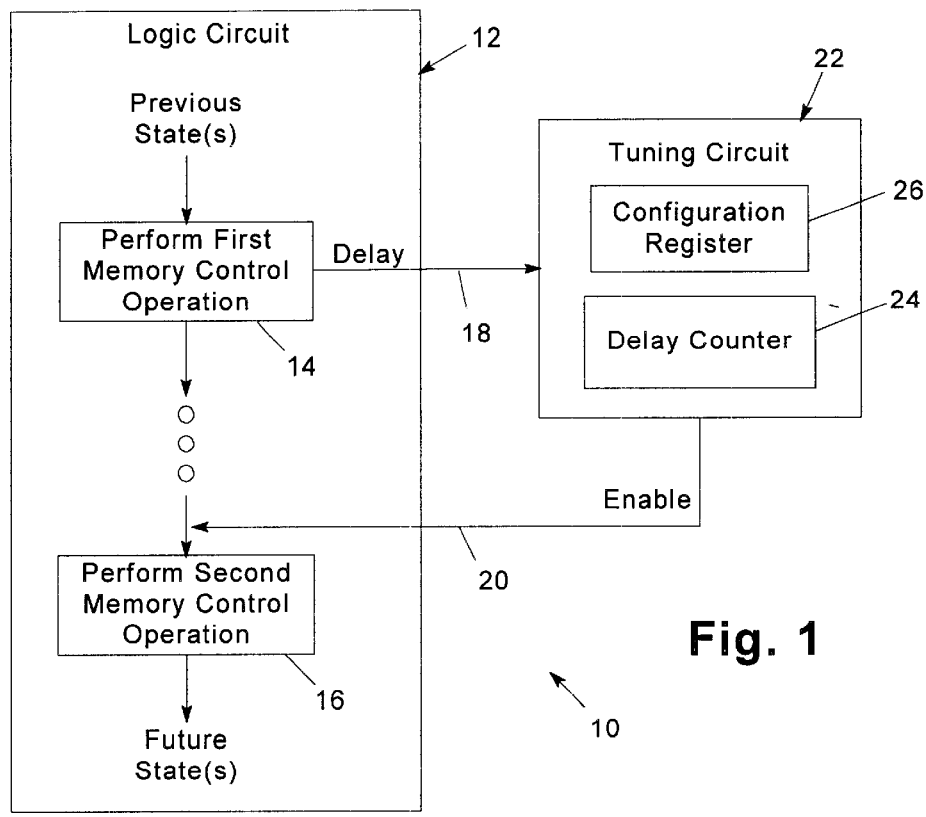
FIG. 1 is a block diagram of a memory controller circuit arrangement utilizing a tuning circuit consistent with the invention.

As shown in FIG. 1, for example, a memory controller 10 may include a logic circuit 12, which implements a state machine having a plurality of stages, including stages 14 and 16 where first and second memory control operations are performed. It should be appreciated that logic circuit 12 may include practically any type of state machine utilized in connection with the control of memory storage devices, and may include other logic circuitry as is well known in the art. As such, an indeterminate number of stages are illustrated before and after stages 14 and 16. It should be appreciated that any number of stages, even no stages, may be interposed between stages 14 and 16 as well.

The memory control operations may represent practically any timed operations performed by a memory controller, principally including, for example, asserting or deasserting any of a number of memory control signals to a memory storage device, latching any of a number of signals received from the memory storage device, driving new data signals to the memory storage device, etc. The first and second memory control operations performed at stages 14 and 16 may also be related with one another in various manners, e.g., asserting and deasserting the same control signal, asserting or deasserting different control signals, latching the same or different signals returned from the memory storage device, etc. Moreover, the first and second memory control operations may be performed during the same memory access cycle, during successive memory access cycles, or in separate, non-successive memory access cycles.

The first and second memory control operations in the context of the invention must be separated in time by a predetermined delay associated with a timing parameter for the particular memory storage device coupled to memory controller 10. A timing parameter represents a particular value for a timing characteristic common to different memory storage devices suitable for use with the memory controller. A timing parameter may be specified as a minimum time, e.g., in nanoseconds. In the alternative, a timing parameter may be specified as a minimum number of clock cycles. Furthermore, given that a memory controller is typically operated synchronously, typically the delay inserted between the first and second memory control operations is represented by a selected number of cycles for the memory controller clock, irrespective of the units of a timing parameter.

A wide variety of timing characteristics may be relevant for different types of memory storage devices. For example, suitable timing characteristics for Synchronous DRAM's include, among others, bank cycle time ($t_{RC}$), active command period ($t_{RAS}$), data input to precharge time ($t_{DPL}$), precharge time ($t_{RP}$), $\overline{RAS}$ to $\overline{CAS}$ delay ($t_{RCD}$), $\overline{CAS}$ latency ($t_{AA}$), etc. Other timing characteristics may also exist for different types of memory storage devices. In each case, the particular timing characteristics that are relevant for a given memory storage device are typically well known in the industry, and it is typically with respect to one or more of these particular timing characteristics for which it is desirable to tune the performance of a memory controller in the manner disclosed herein.

In memory controller 10, the delay between the performance of the first and second memory control operations is controlled by asserting a delay signal at stage 14, representing a request to delay the operation of the second memory control operation for a selected number of cycles. Performance of the second memory control operation is initiated by enabling a state transition to stage 16, as represented by enable signal 20.

A tuning circuit 22, including a programmable delay counter 24 and a configuration register 26, is illustrated as receiving delay signal 18 and outputting enable signal 20. Typically, delay counter 24 is programmed to cycle a selected number of clock cycles based upon the desired number of clock cycles to wait between performing the first and second memory control operations. The selected number of clock cycles may be equal to the total number of cycles between the first and second memory control operations, or may differ, e.g., if other delays already exist between performance of the first and second memory control operations. In this latter instance, for example, assertion of the delay and/or enable signals may be offset one or more cycles from performance of the memory control operations.

It should be appreciated based upon a reading of the material herein that mechanisms other than enable signals may be used to initiate performance of the second memory control operation subsequent to the first memory control operation. Examples include, but are not limited to removal of a hold signal, a signal voltage reaching a comparison threshold, etc.

A programmable delay counter consistent with the invention is generally configured to cycle a programmed number of cycles and thereafter cause the enable signal to be asserted for the purpose of initiating performance of the second memory control operation. The delay counter is programmed based upon a delay count provided from configuration register 26. The delay count may be equal to the total number of cycles to delay, or may be a portion of the total number of cycles, e.g., if other delays are present in the counter.

Figure 2:
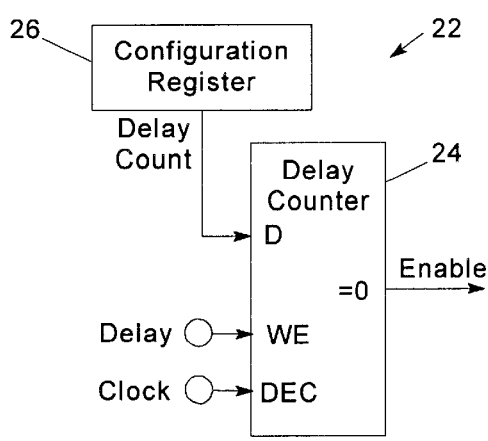
FIG. 2 is a block diagram of the programmable delay counter in the memory controller circuit arrangement of FIG. 1.

Typically, a programmable delay counter consistent with the invention may be configured either as a decrement-type counter or an increment-type counter, among other variations. FIG. 2 illustrates, for example, a decrement-type implementation of the programmable delay counter 24 of tuning circuit 22, where the counter receives at its data (D) input the delay count from configuration register 26. The delay count is written into counter 24 by assertion of the write enable (WE) input via delay signal 18. Thereafter, a clock signal for the memory controller, coupled to the decrement (DEC) input of the counter, decrements the value stored in the counter once each clock cycle. Cycling of the counter for the number of cycles corresponding to the delay count is then detected via a compare-to-zero (=0) output, from which enable signal 20 is derived.

Figure 3:
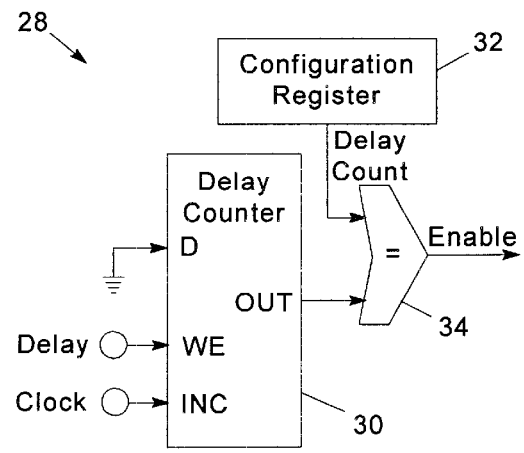
FIG. 3 is a block diagram of alternate programmable delay counter to that illustrated in FIG. 2.

An increment-type counter implementation is illustrated by tuning circuit 28 of FIG. 3, where a counter 30 is receives at its data (D) input an initial value of zero. The counter is initialized to a zero count in response to assertion of the write enable (WE) input via delay signal 18. Thereafter, the clock signal for the memory controller, coupled to the increment (INC) input of the counter, increments the value stored in the counter once each clock cycle. Cycling of the counter for the number of cycles corresponding to the delay count is then detected via a comparison block 34 that receives as its inputs the output (OUT) of counter 30 and the delay count from configuration register 32. As a result, enable signal 20 is asserted when the output of the counter matches the delay count stored in the register.

Loading of the configuration register to program the programmable counter may be performed in a number of manners. For example, one or more external pins for the controller may be used to specify the delay count. In the alternative, the delay count may be supplied via an external component, e.g., via a specific instruction over a network or bus. Moreover, the delay count may be hardwired into different physical implementations, whereby a common design of memory controller may be reused with minor modifications in the manufacture of several different memory controller models tailored for use with different memory storage requirements. Furthermore, delay counts may be grouped into sets so that the same pins/commands may collectively control multiple parameters.

Other manners of programming the programmable counter may be used in the alternative. For example, a dynamic control circuit may be configured to start with one or more conservative parameters, to monitor the error rate of the memory storage device while progressively accelerating the parameters, and to then decelerate one or more of the parameters whenever errors are detected.

Returning to FIG. 1, logic circuit 12 and tuning circuit 22 each represent a circuit arrangement, that is, an arrangement of analog and/or digital electronic or optical components electrically or optically coupled with one another via conductive traces, signaling paths and/or wires, whether implemented wholly in one integrated circuit device or implemented in a plurality of integrated circuit devices electrically coupled with one another via one or more circuit boards. Moreover, it should be recognized that integrated circuit devices are typically designed and fabricated using one or more computer data files, referred to herein as hardware definition programs, that define the layout of the circuit arrangements on the devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

Figure 4:
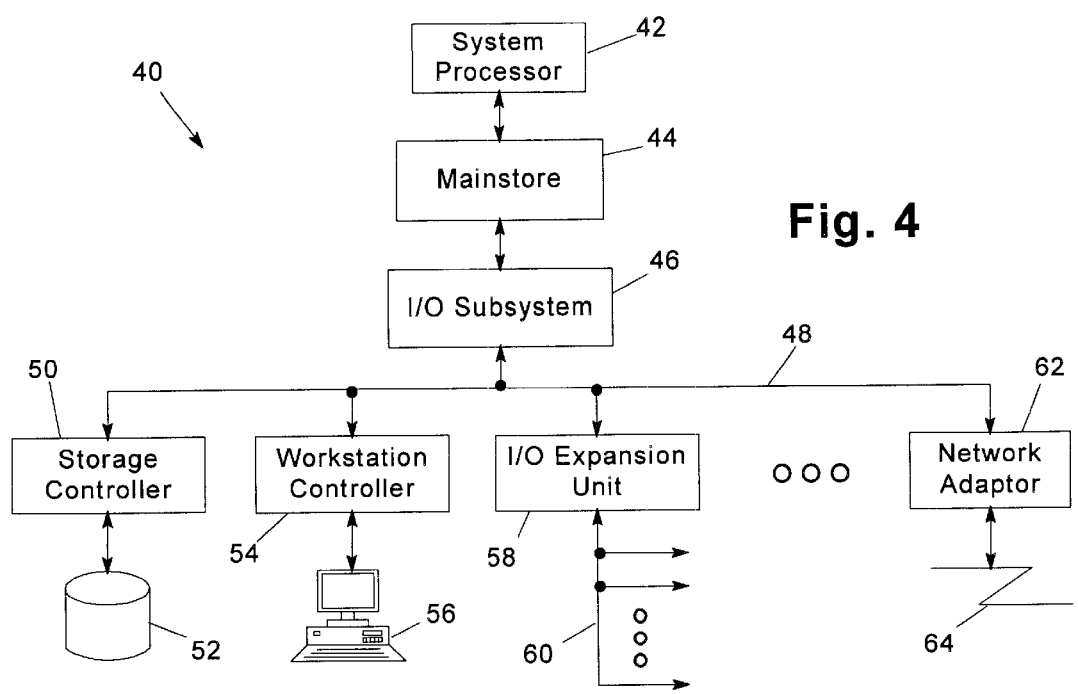
FIG. 4 is a block diagram of a data processing system consistent with the invention.

Turning now to FIG. 4, a data processing system 40 consistent with the invention is illustrated. Data processing system 40 is representative of any of a number of computers and like systems. For example, data processing system 40 includes a system processor 42 coupled to a mainstore memory 44, which is in turn coupled to various external devices via an input/output (I/O) subsystem 46. Subsystem 46 is coupled to a plurality of external devices via a system bus 48. Various types of external devices are represented in FIG. 4, including a storage controller 50 (used to interface with one or more storage devices 52), a workstation controller 54 (used to interface with one or more workstations 56), an I/O expansion unit 58 (used to interface with additional devices via an I/O bus 60), and a network adaptor 62 (used to interface with an external network represented at 64).

It should be appreciated that a wide variety of alternate devices may be coupled to data processing system 40 consistent with the invention.

Data processing system 40 may be implemented, for example, as a midrange computer system, e.g., the AS/400 midrange computer available from International Business Machines Corporation. It should be appreciated that the invention may be applicable to other computer systems, e.g., personal computers, mainframe computers, supercomputers, etc., not to mention other data processing systems that utilize a memory controller, such as embedded controllers; communications systems such as bridges, routers and switches; consumer electronic devices; and the like.

In the illustrated embodiment, a memory controller consistent with the invention is implemented in network adaptor 62, which may be, for example, an asynchronous transfer mode (ATM) adaptor suitable for connecting to an ATM network. However, it should be appreciated that the principles of the invention may be applicable to network adaptors for other types of networks, e.g., TCP/IP networks, LAN and WAN networks, frame relay networks, and the like. Moreover, it should be appreciated that a memory controller consistent with the invention may also be utilized in other components in data processing system 40, e.g., any of components 50, 54, or 58, or within the main processing structure of the data processing system. Thus, the invention should not be limited to the particular implementation disclosed herein.

Figure 5:
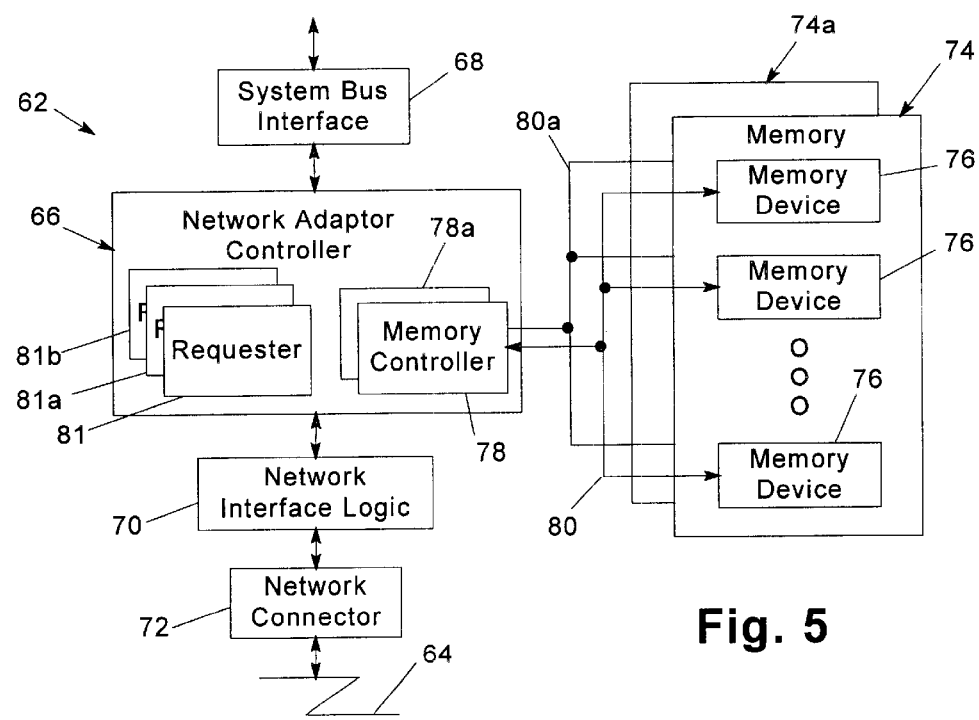
FIG. 5 is a block diagram of the network adapter in the data processing system of FIG. 4.

Network adaptor 62 is illustrated in greater detail in FIG. 5. Network adaptor 62 is under the control of a controller 66 which is interfaced with system bus 48 via a system bus interface block 68. Controller 66 is, in turn, interfaced with network 64 via network interface logic 70 and a physical network connector represented at 72.

Controller 66 relies on one or more memories, e.g., memories 74 and 74a, each comprising a plurality of memory storage devices 76. Data transfer between controller 66 and each memory 74, 74a is controlled via one or more memory controllers, e.g., memory controller 78 for memory 74, and memory controller 78a for memory 74a. A series of I/O signals (e.g., signals 80 and 80a respectively for controller 78 and 78a) are used to control the data transfer with each memory. A plurality of requesters 81, 81a, 81b are also represented in controller 66, representing various components in the controller that may request a data transfer to or from memory 74, 74a. For example, a requester may represent various components within the receive or transmit circuitry within controller 66. Moreover, a requester may also represent an external access command received by controller 66.

It should also be appreciated that any number of requesters, and memory controller/memory pairs may be disposed network adaptor 62. For example, separate packet and control memories may be utilized in network adaptor 62, thus requiring two memories and two associated memory controllers. Furthermore, it should be appreciated that a memory controller may also interface with more than one memory if desired.

Each memory storage device 76 in each memory is responsive to dedicated I/O signals provided by the associated memory controller 78, 78a, which are dictated by the design of the specific memory storage devices. Moreover, as discussed above, the memory storage devices may have one or more timing parameters providing specific minimum delays that are required to satisfy certain timing characteristics of such devices. In the illustrated embodiment, memory storage devices 76 are synchronous DRAM devices, e.g., the IBM 0364164 64-MB Synchronous DRAM's available from International Business Machines Corporation. The counting parameters and interface logic necessary for controlling the data transfer with such devices are generally known in the art.

Figure 6:
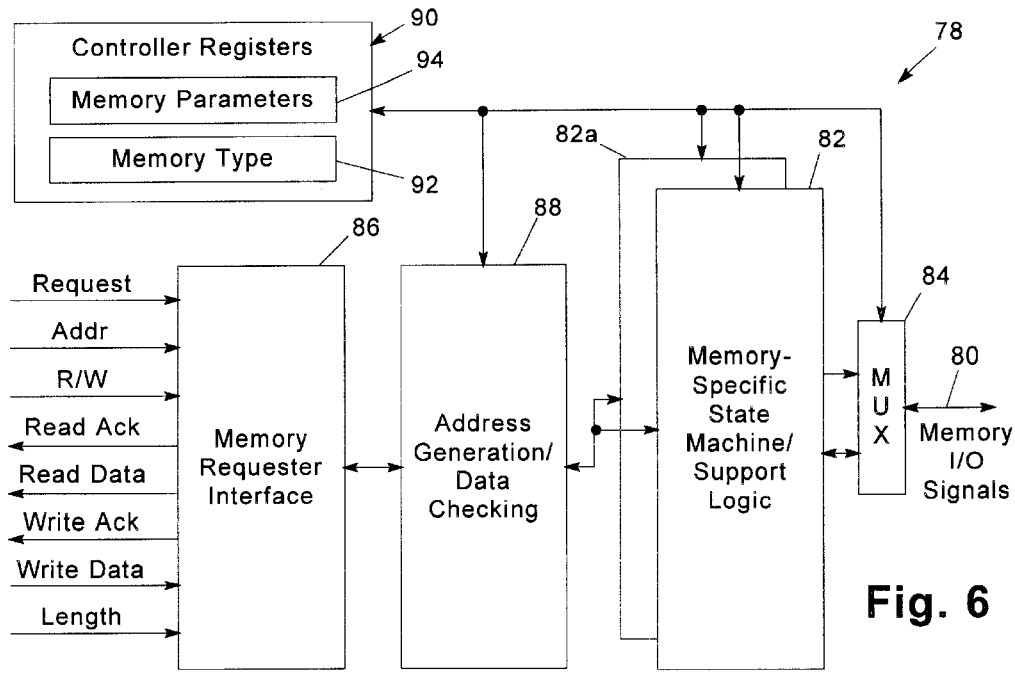
FIG. 6 is a block diagram of the memory controller in the network adapter of FIG. 5.

Memory controller 78 is illustrated in greater detail in FIG. 6, including a series of memory-specific state machine/support logic blocks 82, 82a that are coupled to the memory I/O signals 80 via a multiplexer 84. A memory requester interface 86 is configured to receive the various control signals from one or more memory requesters (not shown in FIG. 6) in a manner well known in the art. It should be appreciated that when multiple requesters are provided, additional interface logic (not shown) may be required to arbitrate between the multiple requesters. Block 86 is interfaced with an address generation/data checking block 88, which is in turn coupled to blocks 82, 82a.

Blocks 86 and 88 perform with recognized interface, data checking and address generation operations that are typically generic to various types of memory storage devices. However, in that the timing characteristics and protocols necessary for interfacing with different types of memory storage devices may differ, it may be desirable in certain memory controller designs to implement multiple memory-specific state machine/support logic blocks, e.g., as represented in FIG. 6. For example, it may be desirable to configure block 82 to control Synchronous DRAM devices, and block 82a to control SRAM devices. Other combinations of device types may be supported in the alternative.

Memory controller 78 also includes a bank of controller registers 90, including a memory type register 92 and a memory parameters register 94. Additional registers, e.g., status and error registers, interrupt registers, other control registers, and the like, may also be supported as needed.

Memory type register 92 is utilized to activate one of the available state machines in the memory controller (e.g., as represented by blocks 82, 82a), to permit the memory controller to operate with different types of memory storage devices. In particular, based upon the value stored in memory type register 92, an enable signal is supplied to one of blocks 82, 82a to enable the operation of the state machine. Furthermore, the enable signal is transmitted to multiplexer 84 as a selector signal to couple memory I/O signals 80 with one of blocks 82, 82a. It should be appreciated that, in the alternative, more than two memory device types may be supported, or only one such device type may be supported, whereby register 92, multiplexer 84, and additional block 82a would not be required.

To adequately tune the performance of memory controller 78 to operate with various memory storage devices having different parameters, memory parameters register 94 is initialized with one or more delay counts corresponding to various timing parameters for which it is desirable for the controller to meet. Such delay counts are provided to each of blocks 82, 82a to configure the state machines to operate in accordance with the timing parameters represented by the delay counts in the register.

Figure 7:
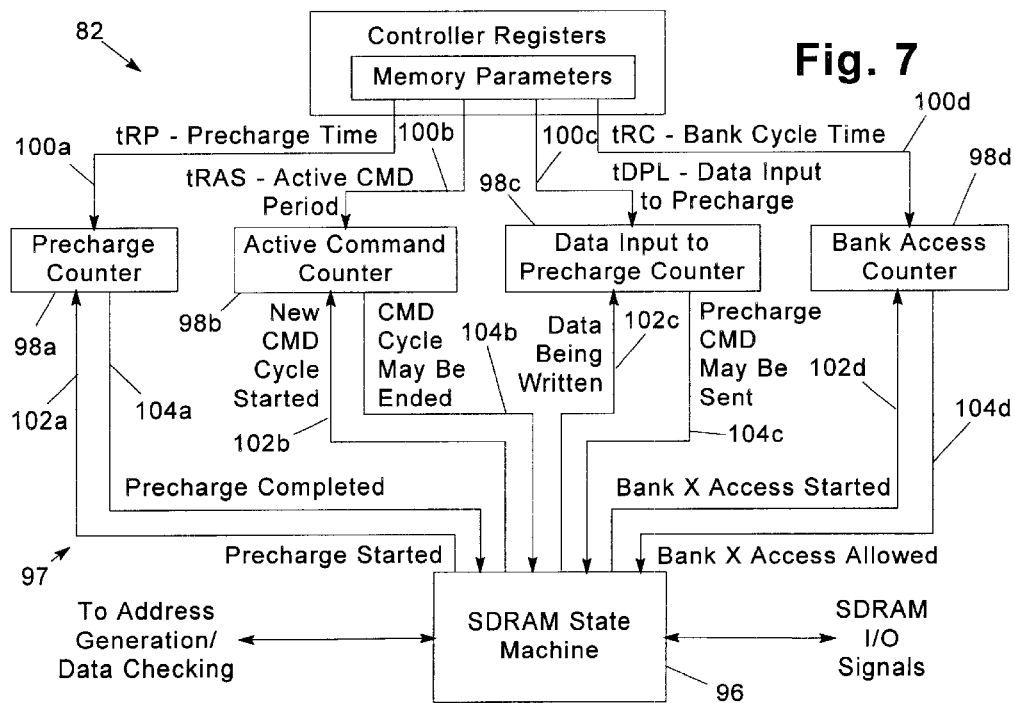
FIG. 7 is a block diagram of the memory-specific state machine/support logic block in the memory controller of FIG. 6.

As best shown in FIG. 7, for example, block 82 includes a Synchronous DRAM-specific state machine 96 which passes I/O signals between Synchronous DRAM memory storage devices and address generation/data checking block 88 of FIG. 6.

A tuning circuit 97 tunes the performance of state machine 96 to better operate with different Synchronous DRAM memory storage devices by tailoring the delays between certain memory control operations to meet several different timing characteristics relevant to Synchronous DRAM devices.

A first such timing characteristic is the precharge time ($t_{RP}$), which represents the minimum time required to precharge a bank on a particular Synchronous DRAM device prior to initiating a new command on the device. In this instance, the first memory control operation is the initiation of a precharge operation, and the second memory control operation is the issuance of a new command. The delay between such operations is controlled by a precharge counter 98a, which is programmed via a delay count supplied via a precharge time line 100a from memory parameters register 94. Counter 98a is started in response to a delay signal issued by state machine 96 over a precharge started line 102a. In turn, the counter returns an enable signal to state machine 96 over a precharge completed line 104a, after cycling the number of cycles specified by the delay count provided over line 100a.

A second timing characteristic is the active command period ($t_{RAS}$), which represents the minimum time required to process a command on a particular Synchronous DRAM device prior to initiating a precharge in anticipation of a next command on the device. In this instance, the first memory control operation is the start of a command cycle on a particular memory bank, and the second memory control operation is the initiation of a precharge operation on the bank. The delay between such operations is controlled by an active command counter 98b, which is programmed via a delay count supplied via an active command period line 100b from memory parameters register 94. Counter 98b is started in response to a delay signal issued by state machine 96 over a new command cycle started line 102b. The counter returns an enable signal to state machine 96 over a command cycle may be ended line 104b, after cycling the number of cycles specified by the delay count provided over line 100b.

A third timing characteristic is the data input to precharge ($t_{DPL}$), which represents the minimum delay that must occur after data is written to the device before a precharge operation may be initiated in anticipation of a next command on the device. In this instance, the first memory control operation is the completion of data being written to a particular bank on the device, and the second memory control operation is the initiation of a precharge operation on the bank. The delay between such operations is controlled by a data input to precharge counter 98c, which is programmed via a delay count supplied via a data input to precharge line 100c from memory parameters register 94. Counter 98c is started in response to a delay signal issued by state machine 96 over a data being written line 102c. The counter returns an enable signal to state machine 96 over a precharge command may be sent line 104c, after cycling the number of cycles specified by the delay count provided over line 100c.

A fourth timing characteristic is the bank cycle time ($t_{RC}$), which represents the minimum delay that must occur between activating successive commands on a particular bank of the device. In this instance, the first memory control operation is the activation of a first command on a particular bank on the device, and the second memory control operation is the activation of a second command on the same bank of the device. The delay between such operations is controlled by a bank access counter 98d, which is programmed via a delay count supplied via a bank cycle time line 100d from memory parameters register 94. Counter 98d is started in response to a delay signal issued by state machine 96 over a bank X access started line 102d. The counter returns an enable signal to state machine 96 over a bank X access started line 104d, after cycling the number of cycles specified by the delay count provided over line 100d.

It should be appreciated that other timing characteristics may also be controlled via additional counters in the manner discussed herein, which will typically be dictated by the particular design of the various memory storage devices for which it is desirable to interface with the memory controller. For example, FIG. 7 illustrates the counters suitable for tuning the performance of a single bank of a memory storage device. However, many if not all Synchronous DRAM devices are implemented as multi-bank devices, permitting accesses to different banks to be interleaved to improve the overall performance of such devices. As such, additional counters suitable to tune the performance of the memory controller for such other banks may be utilized, but are not shown. Specifically, it should be appreciated that each bank typically would require separate $t_{RC}$ counters. Application of the principles of the invention to tune the performance of such additional banks is within the abilities of one of ordinary skill in the art having the benefit of the disclosure presented herein.

In each instance, the delay count for a particular timing characteristic would be selected as the minimum number of clock cycles for the memory controller that equals or exceeds the timing parameter for the particular memory storage device for which the memory controller is tuned. Thus, for example, if one particular memory storage device had a timing parameter of 68 ns, while another particular memory storage device had a timing parameter of 37.5 ns, with a memory controller running with a 7.5 ns clock cycle, an optimum delay count for the former device would be 10, while the optimum delay count for the latter device would be 5.

Figure 8:
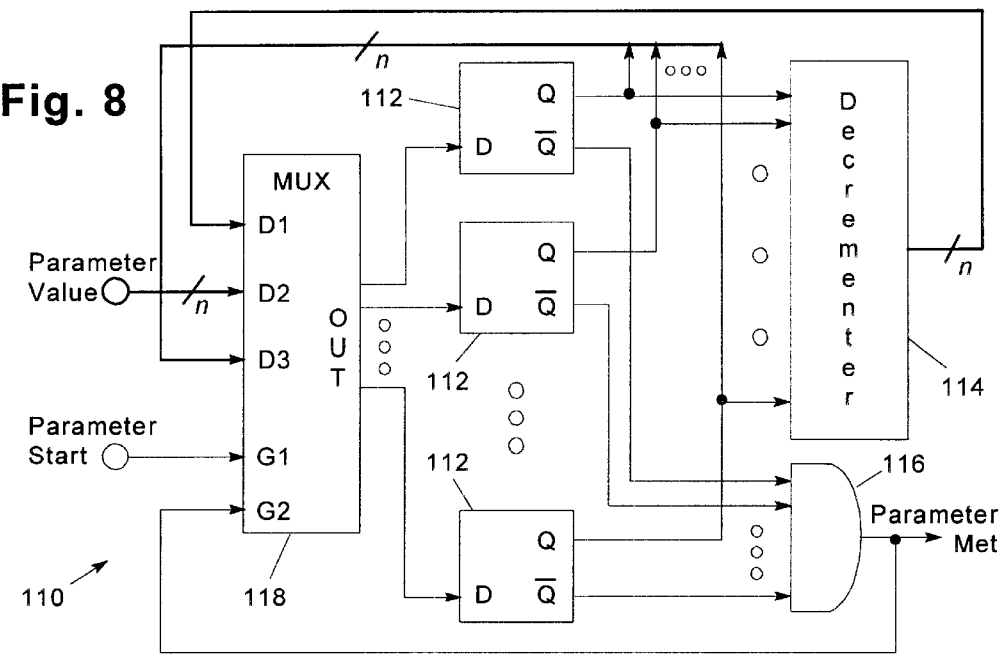
FIG. 8 is a block diagram of a decrement-type programmable delay counter suitable for use in the memory-specific state machine/support logic block of FIG. 7.

Each of counters 98a–d may be implemented using either a decrement-type counter or an increment-type counter, as discussed previously. FIG. 8 illustrates, for example, one suitable implementation of a decrement-type counter 110. Counter 110 includes 1 . . . n 1-bit latches 112, where n is the number of bits necessary to store the maximum delay count of that particular counter. For example, a 4-bit counter would be sufficient to provide up to a 16-cycle delay, which is suitable for handling a significant majority of timing parameters for most memory storage devices.

The active-high (Q) output of each latch 112 is provided to a decrementer block 114, which outputs in response thereto an n-bit wide signal representing one less than the count stored in latches 112. This decremented signal is supplied to a first data input (D1) of a multiplexer 118. Multiplexer 118 has an n-bit output, with each bit thereof supplied to the data (D) input of one of latches 112.

A second input (D2) to multiplexer 118 is coupled to receive an n-bit parameter value, or delay count, from the appropriate bits of the memory parameters register. In addition, the active-high (Q) output of each latch 112 is also provided at a third data input (D3) for multiplexer 118.

The active-low ($\overline{Q}$) outputs of latches 112 are logically AND'ed together via an n-bit AND gate 116, which outputs the enable signal (designated here as "parameter met") when the active-high (Q) outputs of all of latches 112 are zero (indicating a zero count for the counter).

Multiplexer 118 is gated by two gate signals G1 and G2. First gate signal G1 receives the delay signal from the state machine (designated here as "parameter start"). The second gate signal G2 receives the enable signal output by AND gate 116. Which of the three data inputs D1–D3 is coupled to the output of multiplexer 118 is determined by the states of signals G1 and G2 as defined below in Table I:

TABLE I

Multiplexer Output Table

| G1 | G2 | OUT |
|---|---|---|
| 1 | X | D2 |
| 0 | 0 | D1 |
| 0 | 1 | D3 |

Based upon the above-described configuration, it may be seen that, in response to assertion of gate signal G1, the delay count supplied at input D2 is output by multiplexer 118 to the various latches 112, in turn resulting in the active-high (Q) output thereof being supplied to decrementer 114. During the next clock cycle, when the delay signal has been deasserted, the output of decrementer 114 is passed to the output of multiplexer 118 to decrement the count stored in latches 112 for each clock cycle thereafter until such time as latches 112 store a count of zero. At this time, the enable signal is asserted by AND gate 116, thereby asserting the second gate signal G2, which has the effect of stalling the counter with a value of zero until such time as the counter is restarted via assertion of the delay signal.

Figure 9:
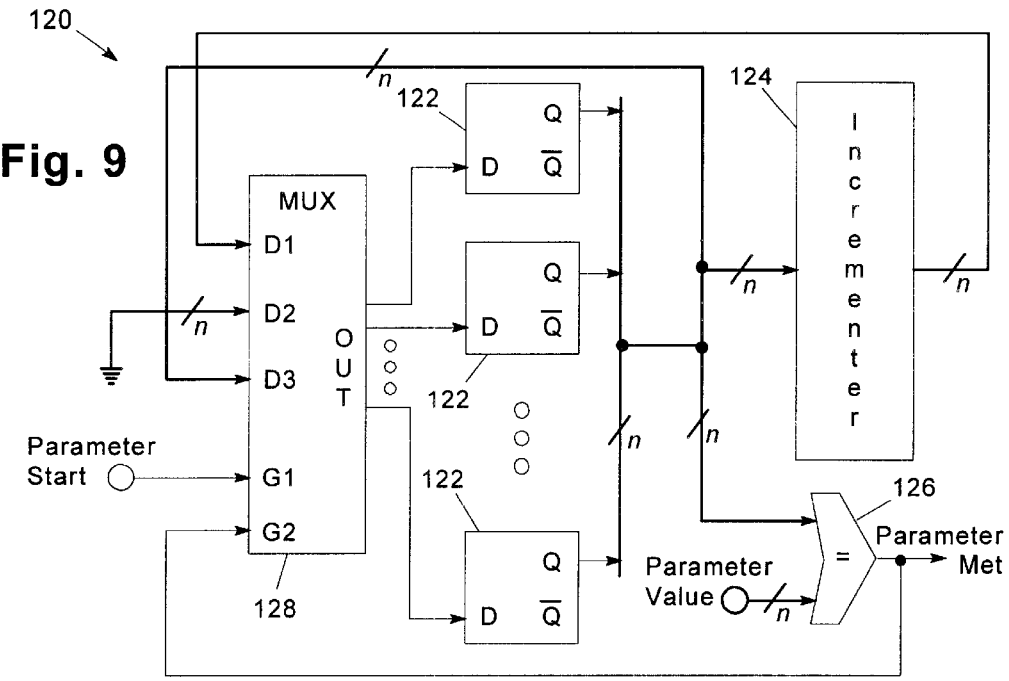
FIG. 9 is a block diagram of an increment-type programmable delay counter suitable for use in the memory-specific state machine/support logic block of FIG. 7.

A suitable implementation of an increment-type counter is illustrated at 120 in FIG. 9. In this implementation, the active-high (Q) outputs of 1 . . . n latches 122 are supplied to an incrementer 124, a comparator 126, and a third data input D3 of a multiplexer 128. The output of incrementer 124 is one plus the current count stored in latches 122, which is supplied to the first data input D1 of multiplexer 128. The second data input D2 of multiplexer 128 is grounded to provided an initial count of zero for the counter.

The output of multiplexer 128 is coupled to the data (D) inputs of latches 122. The first gate input G1 of multiplexer 128 is coupled to the delay signal output by the state machine (designated here as "parameter start"). The second gate input G2 is coupled to receive the output of comparator block 126. The same multiplexer output logic as described above with reference to Table I is also used in this implementation.

In operation, upon assertion of the delay signal from the state machine, the initial zero count applied to data input D2 is output to latches 122 to initialize the counter at zero. Then, upon deassertion of the delay signal, the incremented counter value output from incrementer 124 is passed by multiplexer 128 to latches 122. For each such clock cycle thereafter, the current count stored in latches 122 is compared to the parameter value output by the memory parameters register in comparator block 126. The counter is thus incremented each clock cycle until the current count equals the desired delay count. At such time, the enable signal is asserted by comparator block 126, and the counter is stalled by assertion of the second gate input G2 of multiplexer 128.

It should be appreciated that alternate counter implementations may be utilized to delay assertion of the enable signal the desired number of clock cycles after assertion of the delay signal. Thus, the invention should not be limited to the particular implementations discussed herein.

Figure 10:
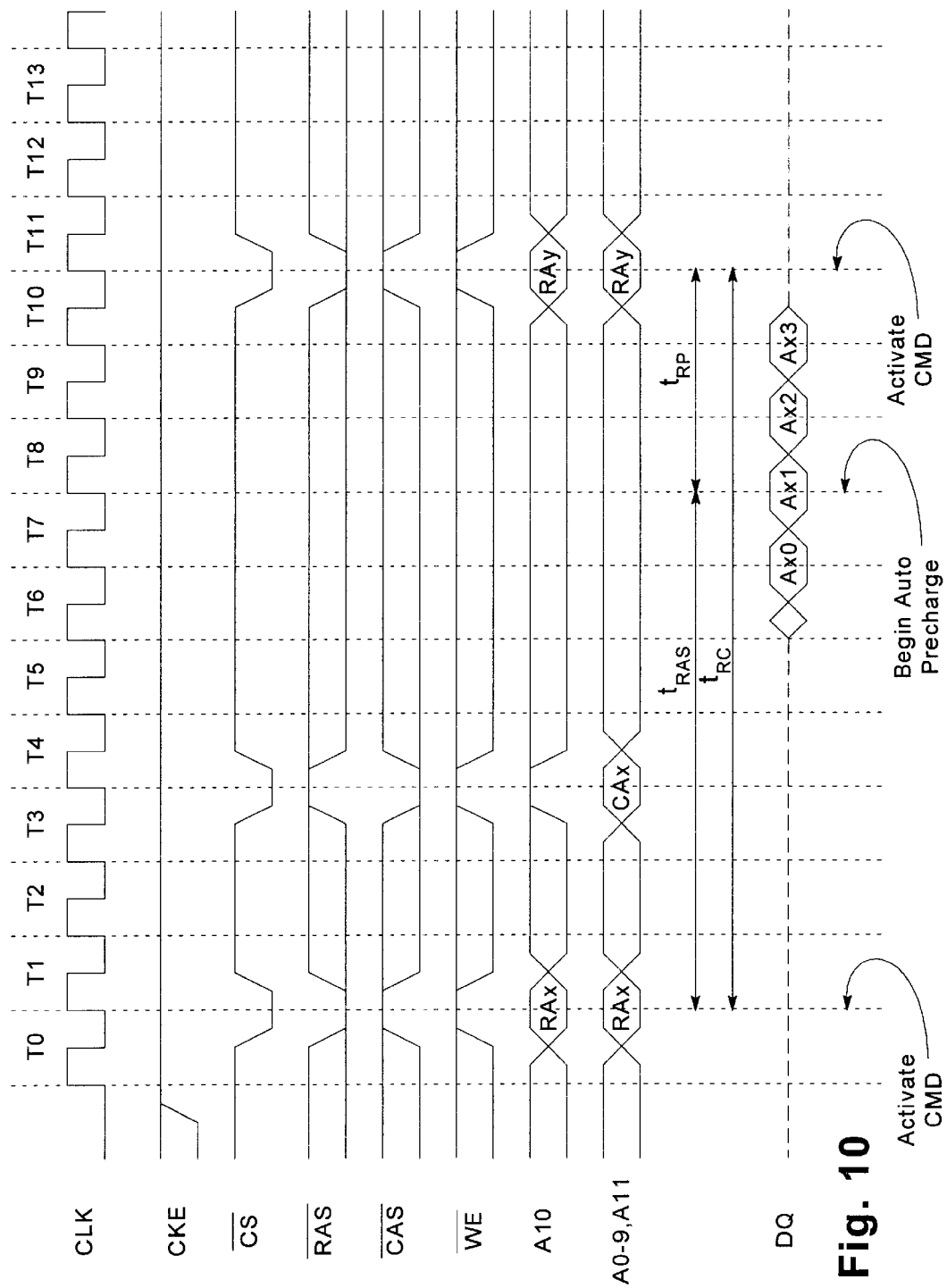
FIG. 10 is a timing diagram illustrating an exemplary timing of memory control operations during a read access using a memory controller consistent with the invention, for use with a memory storage device having a first set of timing parameters.
Figure 11:
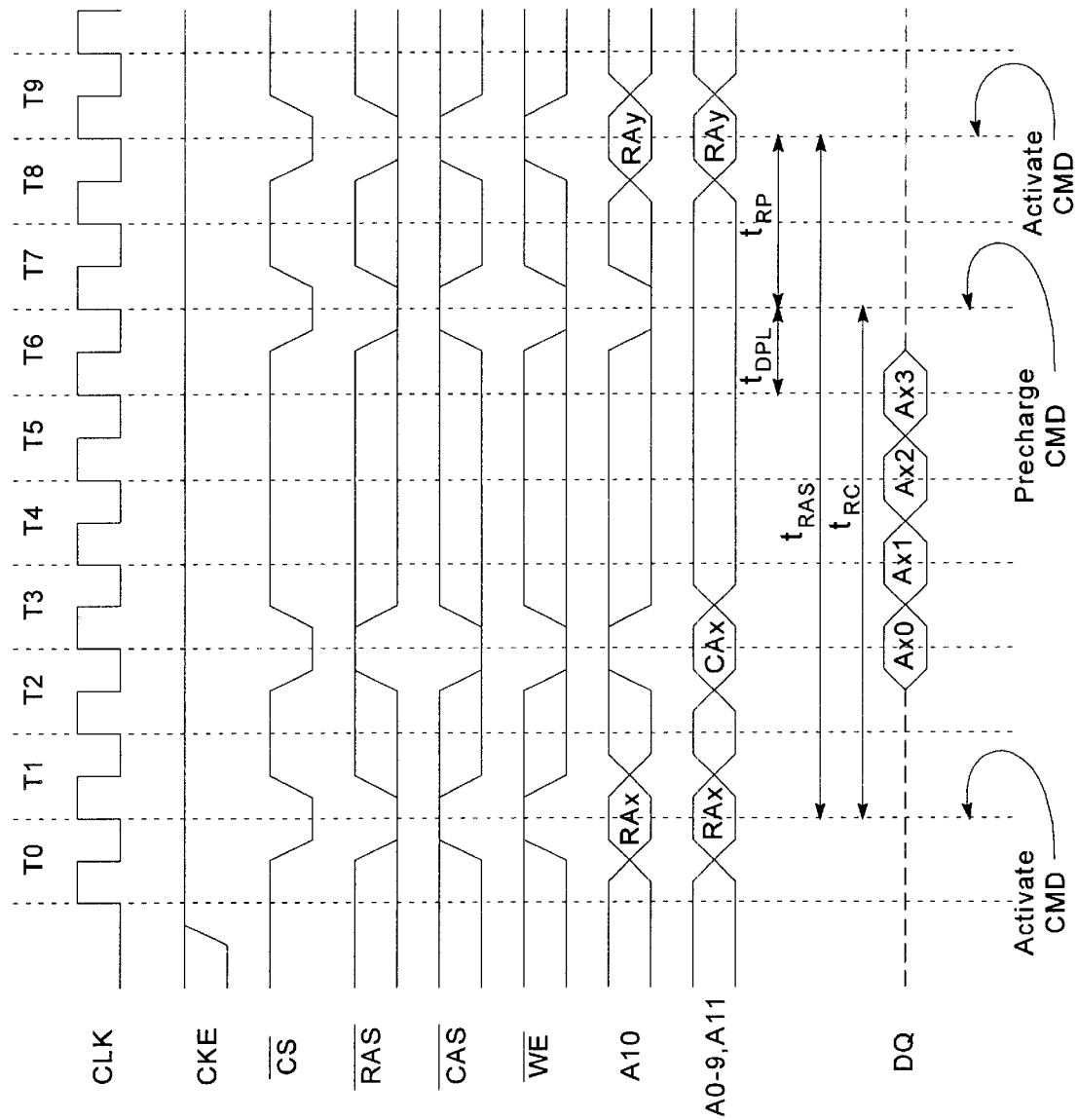
FIG. 11 is a timing diagram illustrating an exemplary timing of memory control operations during a write access using the memory controller consistent with the invention, for use with a memory storage device having a second set of timing parameters.

FIGS. 10 and 11 respectively illustrate suitable timing diagrams for READ and WRITE accesses to hypothetical first and second Synchronous DRAM memory storage devices, respectively. For the READ access, the first Synchronous DRAM is illustrated in FIG. 10 as having a burst length timing parameter of 4, a column address strobe ($\overline{CAS}$) latency of 3-cycles, and a $\overline{RAS}$ to $\overline{CAS}$ delay time ($t_{RCD}$) of 3-cycles. Various control signals relevant to handling a READ access with the first memory storage device are illustrated in FIG. 10, including a clock signal (CLK) a clock enable signal (CKE), an active-low chip select signal ($\overline{CS}$), an active-low row address strobe signal ($\overline{RAS}$), an active-low column address strobe signal ($\overline{CAS}$), an active-low write enable signal ($\overline{WE}$), a 12-bit address signal A0–A11 (with address line A10 illustrated separately), and a data output line (DQ). Represented cycles of the clock signal are labeled as T0–T13.

As shown in FIG. 10, a read access begins in cycle T1 after assertion of the clock enable signal in cycle T0. At this time, the $\overline{CS}$ and $\overline{RAS}$ lines are asserted and the $\overline{CAS}$ and $\overline{WE}$ lines are deasserted. Moreover, the row address (RAx) is supplied on the address lines. With a $\overline{CAS}$ latency of three cycles, therefore, in clock cycle T4, the column address is supplied to the device, the $\overline{CS}$ and $\overline{CAS}$ signals are asserted, the $\overline{RAS}$ and $\overline{WE}$ signals are deasserted, and the column address is supplied on address lines A0–9 and A11. In this particular implementation, address line A10 is asserted to indicate an auto-precharge command. With the $\overline{CAS}$ latency of three cycles, the requested data is supplied over data lines DQ starting at cycle T7. Further, with a burst length of 4, therefore, the data stored at four successive addresses (designated Ax0, Ax1, Ax2 and Ax3) is supplied in the four subsequent cycles.

For the particular memory storage device represented in FIG. 10, the precharge time ($t_{RP}$) is about 20.4 ns. The optimum controller delay to meet this parameter is represented in FIG. 10 as the time period between the autoprecharge at clock cycle T8 and the next activate command begun at clock cycle T11.

The active command period ($t_{RAS}$) for the memory storage device represented by FIG. 10 is about 47.6 ns. The optimum controller delay to meet this parameter is represented in FIG. 10 as the time period between the activate command begun at clock cycle T1 and the beginning of the precharge occurring at cycle T8. In addition, the bank cycle time ($t_{RC}$) for the memory storage device is about 68 ns, with the optimum controller delay therefor represented as the time period between the two successive activate commands at clock cycles T1 and T11, respectively. Also, for this device, a data input to precharge time parameter ($t_{DPL}$) is about 8 ns, but is not shown in FIG. 10 as it is relevant only for a write access.

It is assumed for the purpose of this example that a memory controller consistent with the invention is configured to vary the four parameters discussed above with respect to FIG. 7, namely $t_{RP}$, $t_{RAS}$, $t_{RC}$ and $t_{DPL}$, as well as two additional parameters, the $\overline{CAS}$ latency and $t_{RCD}$. Assuming a memory controller clock cycle time of about 7.5 ns, therefore, the memory controller would optimally be configured with the delay counts specified in Table II below:

TABLE II

FIG. 10 Delay Counts

| Characteristic | Parameter | Delay Count |
| --- | --- | --- |
| $t_{RP}$ | 20.4 ns | 3 |
| $t_{RAS}$ | 47.6 ns | 7 |
| $t_{RC}$ | 68 ns | 10 |
| $t_{DPL}$ | 8 ns | 2 |
| $\overline{CAS}$ Latency | 3 cycles | 3 |
| $t_{RCD}$ | 3 cycles | 3 |

To simplify the illustration, only the signal operations occurring with respect to a single bank of the memory storage device are illustrated in FIG. 10. It should be appreciated that another bank of the device may be accessed during the time period between the two activate commands. For example, to access another bank, the row and column addresses for the alternate bank could be supplied at clock cycles T6 and T9 to kick off an access request while data is being output to the first bank.

FIG. 11 illustrates the timing of the control signals for another memory storage device suitable for use with the same memory controller, this time during a write access. With this memory storage device, the $\overline{CAS}$ latency and $t_{RCD}$ are each two cycles. Moreover, the precharge time of this device is about 15 ns, and the active command period $t_{RAS}$ is about 40 ns. Moreover, the bank cycle time is reduced to about 55 ns. Additionally shown in this figure is a representation of the data input to precharge $t_{DPL}$, which for this device is about 6 ns. Thus, the delay between the final data being written during the write operation initiated at clock cycle T1, to the initiation of the precharge of the next active command, is represented as occurring between the start of clock cycle T6 and the start of the precharge performed in clock cycle T7.

To optimize the same exemplary memory controller described above with reference to FIG. 10, therefore, the optimal delay counts specified below in Table III would be used:

TABLE III

FIG. 11 Delay Counts

| Characteristic | Parameter | Delay Count |
| --- | --- | --- |
| $t_{RP}$ | 15 ns | 2 |
| $t_{RAS}$ | 40 ns | 6 |
| $t_{RC}$ | 55 ns | 8 |
| $t_{DPL}$ | 6 ns | 1 |
| $\overline{CAS}$ Latency | 2 cycles | 2 |
| $t_{RCD}$ | 2 cycles | 2 |

It should be appreciated that the configuration of a suitable state machine to handle the timing of the above-described memory I/O signals to initiate the read/write data transfer in a format suitable for the particular memory storage devices coupled to the controller would be well within the ability of one of ordinary skill in the art.

Various modifications may be made to the illustrated embodiments without departing from the spirit and scope of the invention. Therefore, the invention lies in the claims hereinafter appended.

What is claimed is:

1. A memory controller circuit arrangement for use with a plurality of types of memory storage devices having varying timing parameters related to a performance characteristic common to the plurality of types of memory storage devices, the circuit arrangement comprising:

(a) a logic circuit configured to control data transfer with a memory storage device by performing first and second memory control operations, the memory storage device of the type having a predetermined timing parameter that defines a minimum delay between the first and second memory control operations; and (b) a tuning circuit coupled to the logic circuit and configured to control the delay between the first and second memory control operations to meet the predetermined timing parameter for the memory storage device, the tuning circuit including:

(i) a configuration register configured to store a delay count representative of a number of clock cycles to delay performance of the second memory control operation; and (ii) a programmable delay counter configured to cycle the number of clock cycles represented by the delay count prior to performance of the second memory control operation by the logic circuit.

2. A memory controller circuit arrangement, comprising:

(a) a logic circuit configured to control data transfer with at least one memory storage device by performing first and second memory control operations, the memory storage device of the type having a predetermined timing parameter that defines a minimum delay between the first and second memory control operations; and (b) a tuning circuit coupled to the logic circuit and configured to control the delay between the first and second memory control operations to meet the predetermined timing parameter for the memory storage device by cycling a programmable delay counter a selected number of clock cycles to delay performance of the second memory control operation.

3. The circuit arrangement of claim 2, wherein the first memory control operation includes asserting a control signal, and wherein the second memory control operation includes deasserting the control signal.

4. The circuit arrangement of claim 2, wherein the first memory control operation includes asserting a first control signal, and wherein the second memory control operation includes asserting a second control signal.

5. The circuit arrangement of claim 2, wherein the first and second memory control operations are performed in separate memory access cycles.

6. The circuit arrangement of claim 5, wherein the first and second memory control operations are performed in successive memory access cycles.

7. The circuit arrangement of claim 2, wherein the first and second memory control operations are performed in the same memory access cycle.

8. The circuit arrangement of claim 2, wherein the predetermined timing parameter is associated with a timing characteristic selected from the group consisting of bank cycle time, active command period time, data input to precharge time, precharge time, $\overline{CAS}$ latency, and $\overline{RAS}$ to $\overline{CAS}$ delay time.

9. The circuit arrangement of claim 2, wherein the tuning circuit further comprises a configuration register coupled to the delay counter and configured to store a delay count representative of a number of clock cycles to delay performance of the second memory control operation to meet the predetermined timing parameter for the memory storage device.

10. The circuit arrangement of claim 9, wherein the tuning circuit is configured to store the delay count stored in the configuration register in the delay counter, to decrement the delay counter each clock cycle thereafter, and to enable performance of the second memory control operation when the delay counter reaches a value of zero.

11. The circuit arrangement of claim 9, wherein the tuning circuit is configured to initialize the delay counter with a value of zero, to increment the delay counter each clock cycle thereafter, and to enable performance of the second memory control operation when the delay counter equals the delay count stored in the configuration register.

12. The circuit arrangement of claim 9, wherein the tuning circuit is configured to store the delay count in the configuration register in response to external input.

13. The circuit arrangement of claim 9, wherein the delay count stored in the configuration register equals the total number of clock cycles between performance of the first and second memory control operations.

14. The circuit arrangement of claim 2, wherein the memory storage device has a second predetermined timing parameter defining a second minimum delay between third and fourth memory control operations performed by the logic circuit, and wherein the tuning circuit is further configured to control the delay between the third and fourth memory control operations to meet the second predetermined timing parameter for the memory storage device by cycling a second delay counter a second selected number of clock cycles to delay performance of the fourth memory control operation.

15. An integrated circuit device comprising the circuit arrangement of claim 2.

16. A network adapter comprising the circuit arrangement of claim 2.

17. A data processing system comprising the circuit arrangement of claim 2.

18. A program product, comprising a hardware definition program that defines the circuit arrangement of claim 2; and a signal bearing media bearing the hardware definition program.

19. The program product of claim 18, wherein the signal bearing media includes at least one of a transmission type media and a recordable media.

20. A method of controlling data transfer with a memory storage device using a memory controller, wherein the memory storage device is one of a plurality of types of memory storage devices having varying timing parameters related to a performance characteristic common to the plurality of types of memory storage devices, the method comprising:

(a) receiving a configuration parameter associated with a predetermined timing parameter for the memory storage device that defines a minimum delay between first and second memory control operations performed with the memory storage device; and (b) based upon the configuration parameter, controllably varying the delay between performing the first and second memory control operations by cycling a programmable delay counter a selected number of clock cycles associated with the configuration parameter to delay performance of the second memory control operation.

21. The method of claim 20, further comprising storing a delay count representative of the configuration parameter in a configuration register coupled to the delay counter.

22. The method of claim 21, wherein controllably varying the delay includes:

(a) storing the delay count stored in the configuration register in the delay counter;

(b) decrementing the delay counter each clock cycle thereafter; and (c) enabling performance of the second memory control operation when the delay counter reaches a value of zero.

23. The method of claim 21, wherein controllably varying the delay includes:

(a) initializing the delay counter with a value of zero;

(b) incrementing the delay counter each clock cycle thereafter; and (c) enabling performance of the second memory control operation when the delay counter equals the delay count stored in the configuration register.

24. The method of claim 21, wherein the delay count stored in the configuration register equals the total number of clock cycles between performance of the first and second memory control operations.

* * * * *